United States Patent [19]

Papps et al.

[11] 4,261,682
[45] Apr. 14, 1981

[54] LOADING AND UNLOADING OF VEHICLES

[75] Inventors: Robert K. Papps, Wallingford; Frank E. Webber, Reading, both of England

[73] Assignee: Metal Box Limited, England

[21] Appl. No.: 935,698

[22] Filed: Aug. 21, 1978

[30] Foreign Application Priority Data

Aug. 31, 1977 [GB] United Kingdom ............... 36286/77

[51] Int. Cl.³ .................................................. B66F 9/08
[52] U.S. Cl. ..................................... 414/528; 414/401; 414/584; 198/813; 198/851
[58] Field of Search ............... 414/528, 401, 396, 584; 198/300, 851, 813; 296/28 M

[56] References Cited

U.S. PATENT DOCUMENTS

| | | | |
|---|---|---|---|
| 1,778,852 | 10/1930 | Fitch | 414/401 |
| 2,138,893 | 12/1938 | Wallace | 414/528 |
| 2,710,105 | 6/1955 | Schwartz | 414/528 X |
| 2,916,169 | 12/1959 | De Witt | 414/528 |
| 3,250,408 | 5/1966 | Daniluk et al. | 414/396 |
| 3,666,118 | 5/1972 | Raynes et al. | 414/401 |
| 3,709,552 | 1/1973 | Broadbent | 296/28 M |
| 3,831,785 | 8/1974 | Rezac | 414/528 X |
| 3,878,027 | 4/1975 | Troutner | 198/813 X |
| 3,905,494 | 9/1975 | Yatagai | 414/528 X |
| 3,913,760 | 10/1975 | Koral | 414/528 |
| 4,113,122 | 9/1978 | Lutz | 414/528 X |

FOREIGN PATENT DOCUMENTS

| | | |
|---|---|---|
| 1119691 | 7/1968 | United Kingdom . |
| 1119692 | 7/1968 | United Kingdom . |
| 1196578 | 7/1970 | United Kingdom . |
| 1337835 | 11/1973 | United Kingdom . |

*Primary Examiner*—Stephen G. Kunin
*Assistant Examiner*—Terrance L. Siemens
*Attorney, Agent, or Firm*—Tilton, Fallon, Lungmus & Chestnut

[57] ABSTRACT

Apparatus for loading and unloading of vehicles such as a semi-trailer in which two pairs of continuous chains riding on their side plates extend substantially the length of the vehicle, the pairs being separated by a vertical wall, each pair of chains having a sprocket equipped drive shaft at the rear end of the vehicle with a hydraulic motor for driving the shaft and hydrauically operated struts connected to the bearing housings of the shaft for varying the chain tension.

4 Claims, 7 Drawing Figures

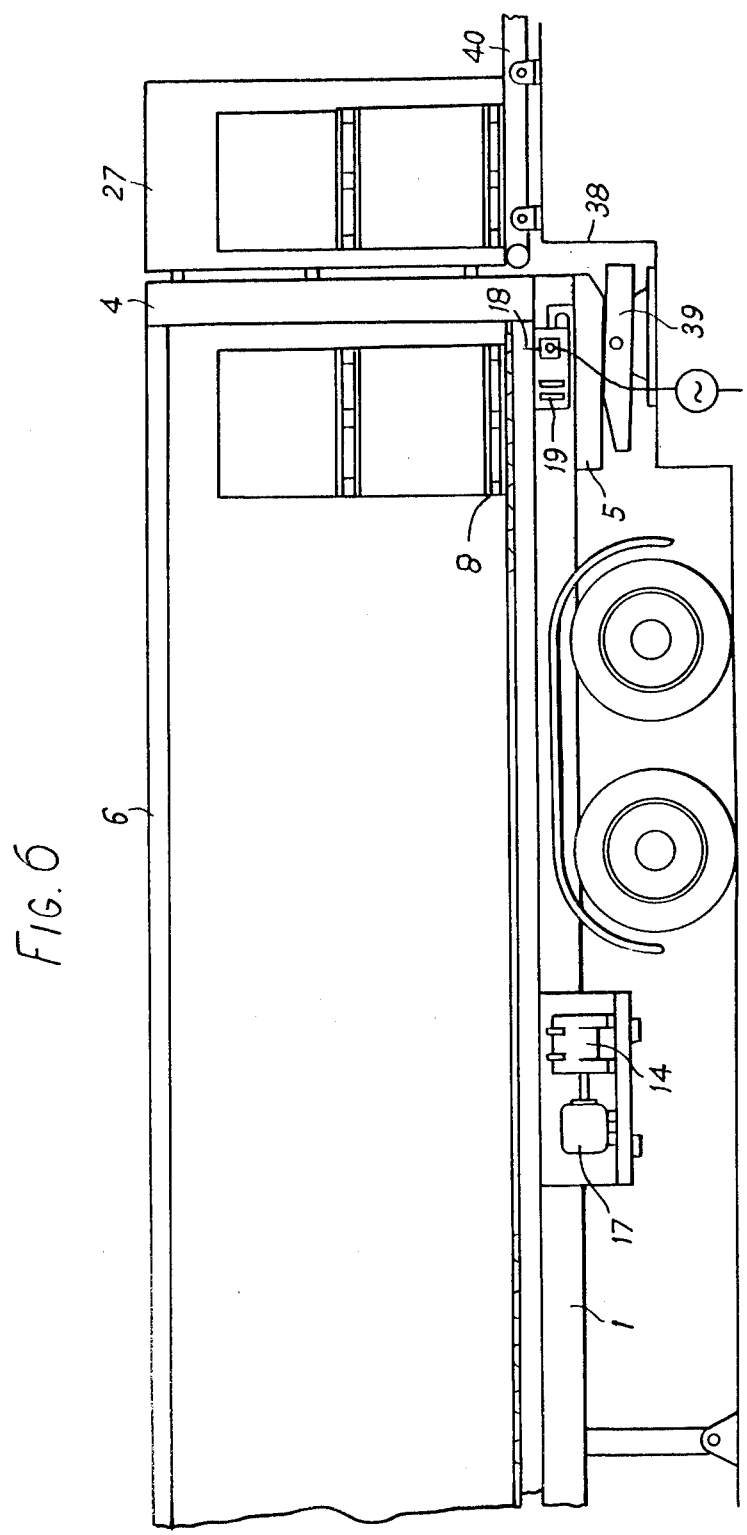

LOADING AND UNLOADING OF VEHICLES

This invention relates to the loading and unloading of vehicles and more particularly but not exclusively to a semi trailer provided with conveyor chains which convey a load during the loading or unloading of the trailer.

Box vans are known which have chains running from the doors into the van. In these vans the load is supported on rollers while the chain engages with the load to provide the motive force to move the load inside the van. Hitherto this arrangement has reduced the load space within the van by a height equal to that occupied by the chain and rollers. Furthermore the van body installation requires the conveyor to be used as the only method of loading and unloading palletised loads. No access to the interior of the van or any part of the load is possible other than by the rear loading doors.

In a first aspect this invention provides apparatus for moving a load upon a vehicle, said apparatus comprising a chain arranged to lie across the vehicle, support a load thereon and pass the weight of the load onto the vehicle so that linear movement of the chain moves the load across the vehicle.

In one embodiment the vehicle has a chassis and the chain is in the form of a continuous loop which includes an upper portion adapted to move a load across the chassis. The chain includes an upper portion guided in a channel member mounted on the chassis; a portion extending round a freely rotating sprocket; a lower or return portion extending parallel to the upper portion; and a driven portion extending around a driven sprocket.

The driven sprocket is preferably mounted on a shaft near the rear of the vehicle said shaft being rotatable within a mounting.

The chain has means to adjust the tension therein.

The tensioning means is preferably a hydraulic strut fixed at one end to the chassis and which acts to move the mounting along the chassis and adjust the tension in the chain.

The sprocket is driven to rotate by a reversible motor. In a preferred embodiment the reversible motor is an hydraulic motor.

The hydraulic power is preferably delivered from means mounted on the vehicle, said means including an electric motor, a pump and a control valve and conduits to deliver the power to the motor.

In a second aspect the invention provides apparatus in the first aspect when mounted upon a vehicle.

In one embodiment the vehicle is a semi trailer, said semi trailer including a chassis, a front frame and a rear frame upstanding therefrom, a roof extending between the frames and side curtains tensionable across the open sides of the vehicle, as defined by the roof, front frame, rear frame and chassis, so as to guide a load during movement of the chain in a direction parallel to the side curtains.

If desired a central partition extends parallel to the side curtains and divides the trailer into two halves, each half being provided with at least one movable chain upon which a load may be moved upon the trailer.

The preferred embodiments of the apparatus have means to permit alignment and attachment of the apparatus to a dock side.

The means to alignment and attachment may conveniently be a pin on the vehicle, adapted to engage with a coupling on a dock side.

One embodiment of the invention will now be described by way of example and with reference to the accompanying drawings in which:

FIG. 3A is a sectional view of the support for the upper chain portion;

FIG. 6 shows the semi trailer during unloading.

Figure 1:
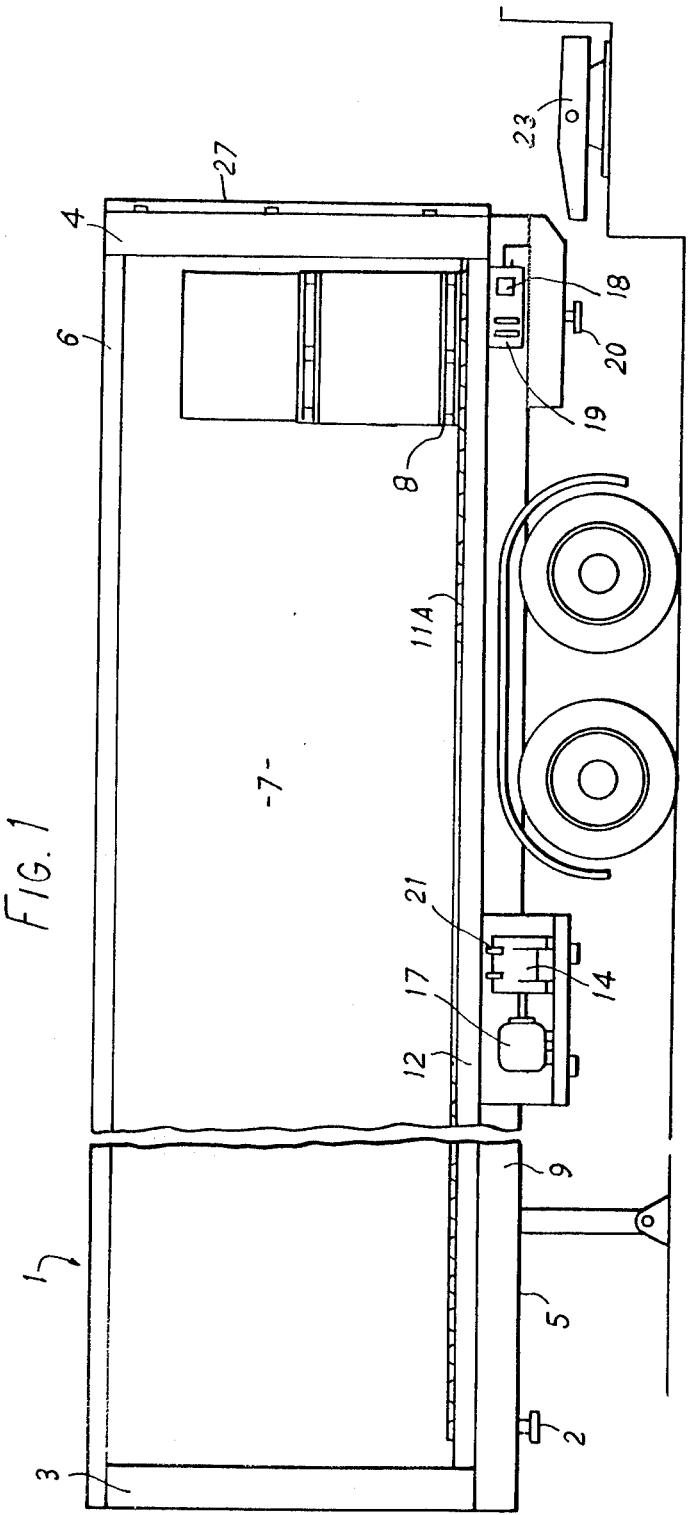
FIG. 1 is a side elevation of a semi trailer for use with road tractor.

FIG. 1 shows the semi road trailer 1 when parked. The semi trailer 1 has a coupling pin 2 (near the front end or left of FIG. 1), which is used to couple the trailer to a tractor (in a known manner). A second coupling pin 20 (near the rear end or right of FIG. 1) is used to anchor the trailer to a dockside coupling during loading and unloading. A suitable coupling is that known as a "fifth wheel" coupling such as is commonly used on articulated lorries.

Figure 2:
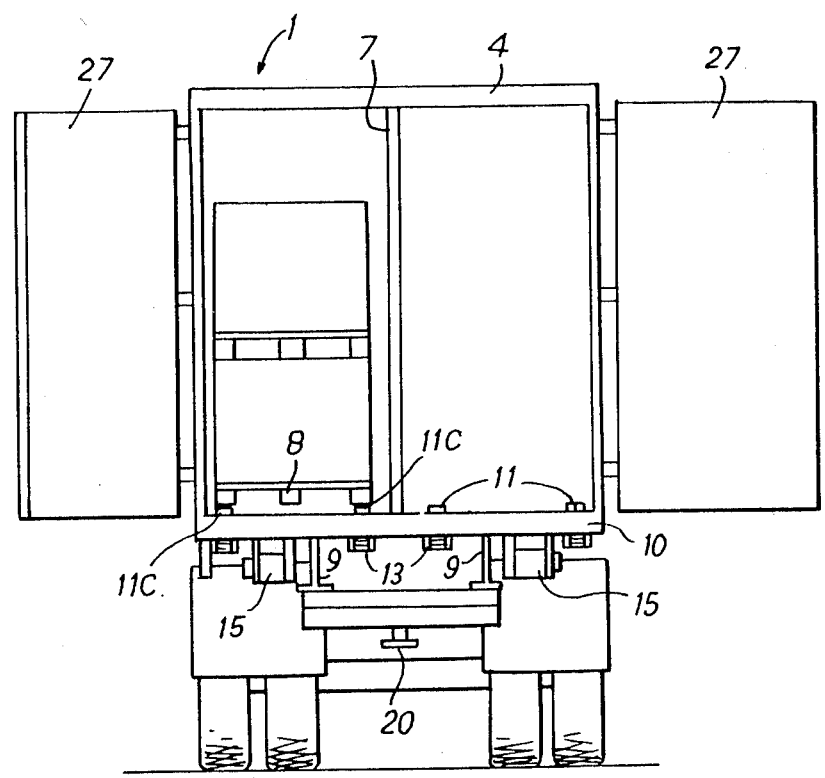
FIG. 2 is an elevation of the rear of the trailer of FIG. 1 showing the unloading chains.

Referring to FIGS. 1 and 2 the trailer can be seen to have a front frame 3 and a rear frame 4 extending upwards from a chassis 5 to a roof 6 which covers the whole trailer. A central partition 7 extends along the length of the trailer to divide the load space into two equal parts. The long sides of the trailer are open.

The chassis 5 has a plurality of cross members which are fixed at right angles to a pair of main beams 9. The rearmost cross member, which is at the base of the rear frame 4, is denoted 10A. The main beams are supported in known manner on a pair of close coupled axles and the wheels fixed thereto. As shown in FIG. 1 the trailer is further supported by a retractable prop, positioned towards the front of the trailer. However, when in transit, the front end load is carried by the tractor.

The well known method of loading such an open-sided trailer is to stack the goods for transport on a pallet, pick the pallet up on a fork lift truck and pass the pallet (such as that denoted 8 in FIGS. 1 and 2) and goods through the open sides of the trailer on to the deck of the trailer. When the trailer has been fully loaded a side curtain (not shown) is drawn shut to confine the load. However, the semi trailer shown in FIGS. 1 and 2 is not only suitable for use according to this known method of loading and unloading but is also particularly adapted for loading and unloading through the rear frame 4 by means of chains 11 driven by a hydraulic motor 15.

In FIGS. 1 and 2, four conveyor chains such as those denoted 11 extend from the rear frame 4 along the trailer towards the front frame 3. In FIG. 2, the pallet 8 and its load rest upon the left hand pair of chains 11. These chains 11 not only support the load but also move the load along the trailer when driven by a means such as that shown in FIGS. 3, 4 and 5.

Figure 4:
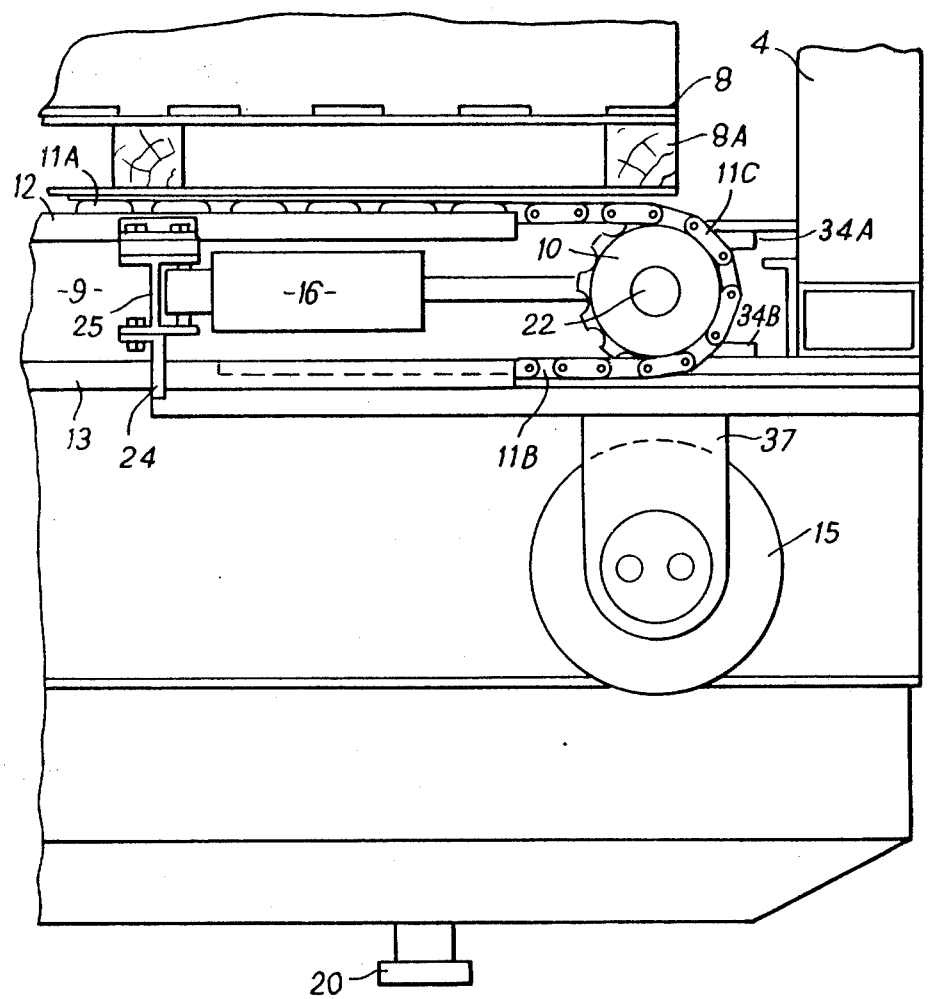
FIG. 4 is a side view of the chain driving members of FIG. 3.

Each chain 11 is in the form of a continuous loop having an upper portion 11A extending along the trailer; a portion extending around a sprocket (not shown) near the front of the trailer; a lower portion 11B returning along the length of the trailer and a driven portion 11C which extends around a driven sprocket 10, positioned near the frame 4 of the trailer (best seen in FIG. 4).

The lower portion 11B of each chain is supported on a lower chain guide 13 which extends beneath the upper guide 12 and parallel to the main beams 9. The lower chain guide 13 has only to support the weight of the lower portion 11B of chain and is therefore only supported by light brackets 24 which hang from the cross members, such as that denoted 25, as shown in FIG. 3.

Figure 3:
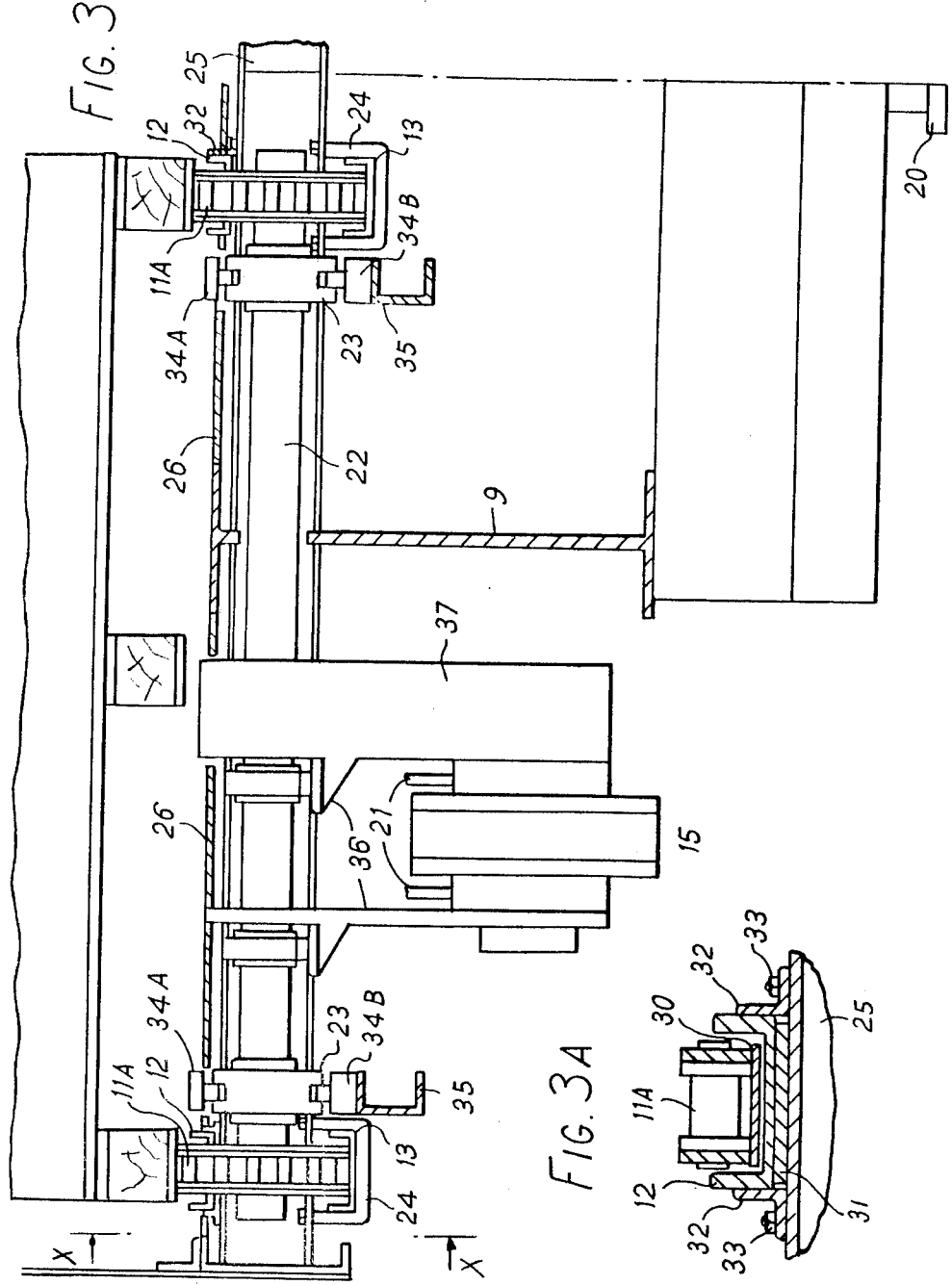
FIG. 3 is a detailed end view of the means for driving the chains in the left half of the trailer of FIG. 2.

The upper portion 11A of each chain 11 is supported in an upper chain guide 12 which is mounted on the chassis 5, so that the weight of the pallet 8 and load is transmitted through the chassis members to the axles as shown in FIGS. 3 and 4. In FIG. 3A the upper portion 11A of the chain rests on a long leaf 30 of spring steel which rests on the bottom of the upper guide channel 12. The sides of the guide channel 12 extend only part way up the thickness of the upper chain portion 11A. The upper guide 12 rests on a spacer 31 which is turn lies on the chassis cross member 25. The upper guide 12 and spacer 31 are held in position on the cross member 25 by a pair of brackets 32 fixed to the cross member by bolts 33. The weight of the pallet 8 therefore passes through the chain portion 11A, the leaf spring 30, the upper guide 12, the spacer 31 and the cross member 25 on to the main beams 9 of the chassis, as will be understood from FIG. 3A and FIG. 4. This sequence of load distribution is replicated at the other cross members along the chassis 5.

The weight of the pallet 8 over the end block 8A in FIG. 4, passes through the driven chain portion 11C on to the driving sprockets 10 which are mounted on an axle 22. The axle 22 is supported in a pair of bearing blocks 23 which have grooves in both top and bottom faces, best seen in FIG. 3. Upper and lower guide bars 34A, 34B, mounted on chassis members 35 engage with the grooves in the sliding blocks 23 to support the blocks 23. The lower guide bars 34B shown in FIG. 5 (in which the top guide bars are omitted for clarity) also serve to distribute the pallet weight, from the axle 22 to the chassis longitudinal members 35 which are hung from the cross members.

Figure 5:
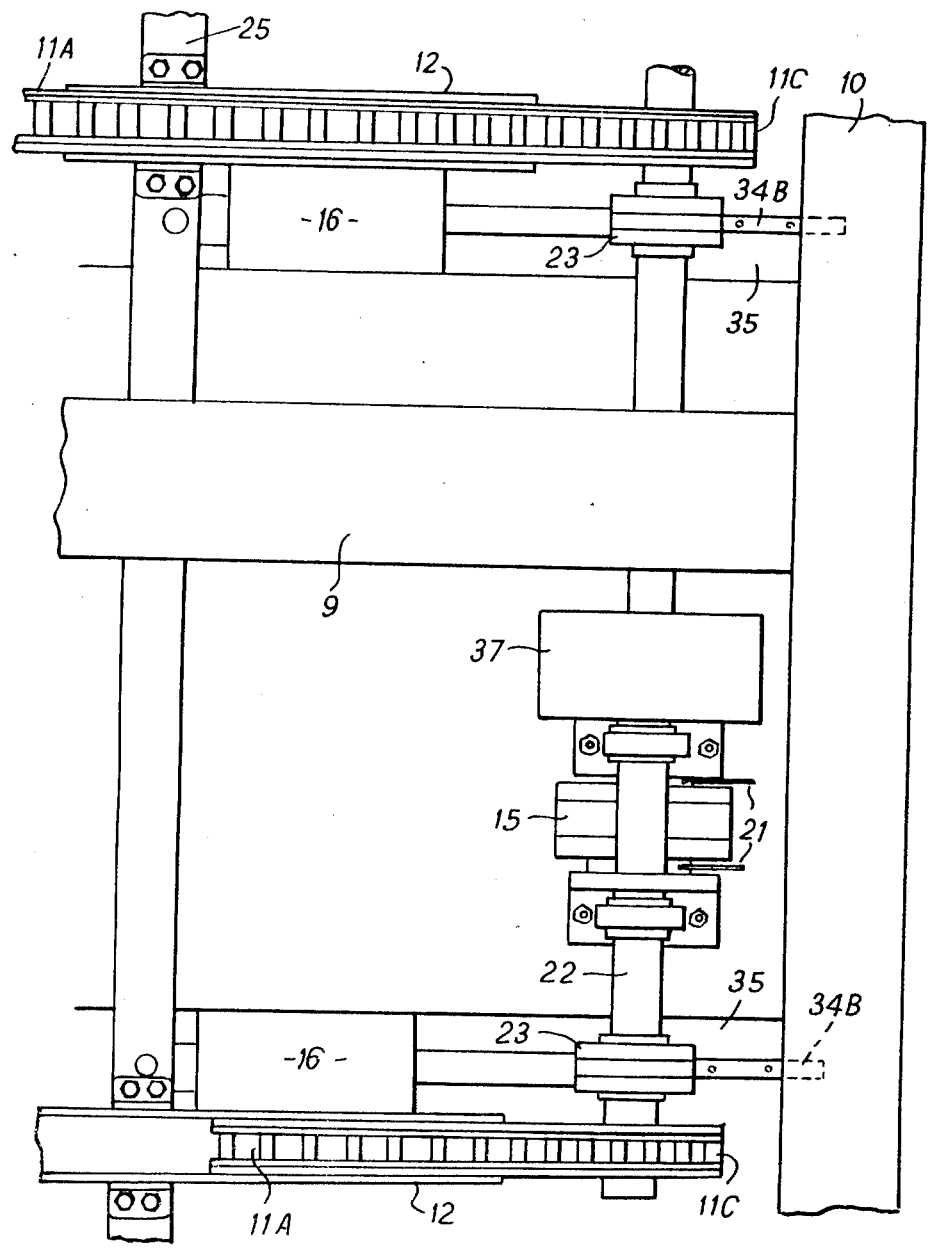
FIG. 5 is a plan view of the chain driving members.

The tension in each chain 11 is adjusted by moving the axle 22 forwards or backwards. To do this the bearing blocks 23 are moved along the guide bars 34A, 34B by means of a pair of hydraulic struts 16. One end of each strut is fixed to the cross member 25 and the other end acts upon its respective bearing block 23, as shown in FIGS. 4 and 5.

The chains 11 are driven, to move the pallet 8 within the trailer, by rotating the axle 22. The axle 22 is driven to rotate by a reversible hydraulic motor 15 which is suspended from the axle by means of a pair of arms 36. The hydraulic motor is connected to the axle by a driving chain which is covered by a drive cover 37. The motor 15 is restrained from rotating about the axle 22 by a tie bar (not shown).

Referring again to FIGS. 1 and 2, it will be seen that the semi trailer 1 is provided with a socket 18 to receive the electric power from the mains supply. The socket is connected through to a motor 17 which is preferably an A.C. electric motor working from a three phase supply. The motor 17 is coupled to a hydraulic pump 14 which provides the hydraulic power not only for the reversible hydraulic motor 15 but also for the tensioning struts 16. The hydraulic pump 14 is connected by pipes 21 to hydraulic controls 19 and to both the struts and the reversible hydraulic motor.

The use of hydraulic power therefore permits the control of the loading or unloading of the pallets on to or off the trailer.

FIG. 6 shows the semi trailer during unloading at a dock-side 38. One door 27 of the end frame 4 is depicted open while the other door has been omitted for clarity. The trailer has been anchored to the dockside by means of the rear coupling pin 20 which is therefore not visible. The chassis 5 engages with a dockside coupling 39 which is similar to known tractor couplings. The trailer is therefore firmly anchored in line with the dockside conveyor 40 which may be a roller conveyor or other kind.

Use of a rear guide plate with coupling pin on the trailer, combined with a dock-mounted fixed height coupling, enables (a) the rear of the trailer to be positioned the correct distance from the loading dock and exactly in alignment with the loading/unloading conveyor;

(b) the rear of the semi trailer to be raised for exact alignment of the trailer and dock conveyors, irrespective of the variable dimensions of the trailer suspension height, trailer type sizes and trailer platform height; and (c) the requirement for any form of conveyor levelling device to be dispensed with on the loading dock.

The electricity supply has been coupled to the socket 18 to actuate the motor 17 and pump 14. The controls 19 have been set to move the left hand pair of chains 11 along the trailer, so that the pallet 8 is moved along the trailer and out through the end frame 4 onto the dockside conveyor 40.

Using a non-reversing external power supply, the trailer hydraulic system provides fully independent drive and reversing facility for each of the two conveyors (nearside or offside) mounted on the trailer. Additionally, the conveyor speed is controlled by the hydraulic system (to match the loading/unloading conveyor) within accurate limits, but can also be adjusted to provide a different conveyor speed on the trailer if required.

The left hand pair of chains 11 or the right hand pair of chains 11 (as shown in FIG. 2) may be used separately or simultaneously for either loading or unloading. In fact one pair may be used for loading while the other pair is used for unloading so that time at the loading dock may be minimized.

It will be understood that the invention may be used for either loading or unloading a trailer or other vehicle. The pallets delivered during loading may not be evenly spaced and so the chains are simply driven continuously so that, when the first pallet reaches the front end frame 3 the chains skid beneath the pallet while subsequent pallets are loading on to form a contiguous array. For convenience and safety, a lightweight floor 26 is fitted between the conveyor runs, as shown in FIG. 3, in order to (i) protect the load being carried from road dirt and adverse weather conditions; and (ii) enable personnel to walk safely through the vehicle/trailer when necessary. This floor is not designed to be load-bearing, as the load is carried on the conveyor chains at all times.

The trailer is provided with side curtains (omitted from the drawings for clarity but which can be of the type depicted in U.S. Pat. No. 3,709,522). After loading by either fork-lift truck or the conveyor chains, the side curtains are tensioned so that no other means of load restraint are required. Forward movement is restricted by the trailer front bulkhead or frame 3 lateral movement by the centrepartition 7 and side curtains; rearward movement by the friction between the pallet base and conveyor chains 11, which are locked to prevent movement when not being used for loading/unloading.

The side curtains not only allow access to both sides of the trailer for its full length during a fork-lift truck loading/unloading operation, but also retain and restrain the load during transit. The rear door frame and curtain lateral tensioning device is constructed in such a manner as to provide a flush inner surface between the tensioned side curtain and the rear door frame. This permits the loading/unloading operation using the trailer conveyor system, without the need to remove the side curtains or provide alternative methods of pallet guidance. During these operations the tensioned side curtain acts as a guide for the loaded pallets.

It will be understood that whilst the invention has been described with reference to a road trailer, it may alternatively be applied to other vehicles such as rail wagons or containers, such as are used for shipping.

What we claim is:

1. Apparatus for moving a load on an elongated vehicle having a chassis and means attached to the chassis for alignment and attachment to a dockside coupling, said apparatus comprising in combination, a pair of laterally spaced-apart continuous chains adapted to bear said load on their side plates and extending substantially the whole length of the vehicle, an upper strand of each chain being supported in a respective channel of the chassis, a drive shaft spanning the two chains and bearing sprockets for driving each chain, an hydraulic motor operably connected with said shaft to rotate the sprockets to move the chains relative to their respective channels, a source of hydraulic power to drive said hydraulic motor, means to control said source of hydraulic power to move each chain, and a pair of hydraulic struts acting between a fixed point in the chassis and the drive shaft to tension said chains, the hydraulic struts being driven by said hydraulic source to a tension suitable for conveying said load on the chains along the chassis.

2. Apparatus according to claim 1 wherein the vehicle has a first pair of chains, a second pair of chains and a rigid partition extending between adjacent chains of said first and second pairs of chains.

3. Apparatus according to claim 1 wherein each channel is equipped with a leaf spring in bearing engagement with the chain side plates.

4. Apparatus according to claim 1 wherein each shaft is supported on bearing blocks slidably mounted on said chassis, said hydraulic struts being coupled to said bearing blocks.

* * * * *